US012743415B2

(12) United States Patent
Kurian et al.

(10) Patent No.: US 12,743,415 B2
(45) Date of Patent: Sep. 22, 2026

(54) MACHINE LEARNING MODEL PROMPT HYDRATION VIA PROMPT REGISTRY AND CONTEXT STORE

(71) Applicant: INTUIT INC., Mountain View, CA (US)

(72) Inventors: Merrin Kurian, San Jose, CA (US); Neo Yuchen, Arcadia, CA (US); Philipp Hertel, Belmont, CA (US); Yujung Shen, Cupertino, CA (US)

(73) Assignee: INTUIT INC., Mountain View, CA (US)

( * ) Notice: Subject to any disclaimer, the term of this patent is extended or adjusted under 35 U.S.C. 154(b) by 145 days.

(21) Appl. No.: 18/429,249

(22) Filed: Jan. 31, 2024

(65) Prior Publication Data

US 2025/0245216 A1 Jul. 31, 2025

(51) Int. Cl.
*G06F 8/35* (2018.01)
*G06F 16/242* (2019.01)
*G06F 40/40* (2020.01)

(52) U.S. Cl.
CPC ............ *G06F 16/243* (2019.01); *G06F 40/40* (2020.01)

(58) Field of Classification Search
CPC ........ G06F 40/30; G06F 40/186; G06F 40/40; G06F 40/284; G06F 16/338; G06F 40/205; G06F 16/334; G06F 40/279; G06F 40/20; G06F 16/2455; G06F 16/248; G06F 16/332; G06F 16/90335; G06F 16/93; G06F 16/3329; G06F 40/56; G06F 16/243
See application file for complete search history.

(56) References Cited

U.S. PATENT DOCUMENTS

| | | | | |
|---|---|---|---|---|
| 12,346,314 | B1 * | 7/2025 | Guerra | G06F 16/235 |
| 12,619,399 | B1 * | 5/2026 | Rambow | G06F 8/35 |
| 2008/0250052 | A1 * | 10/2008 | Jones | G06F 16/93 707/999.102 |
| 2024/0289559 | A1 * | 8/2024 | Gajek | G06F 40/289 |
| 2024/0303473 | A1 * | 9/2024 | Cheng | G06N 3/045 |
| 2024/0354503 | A1 * | 10/2024 | Baruch | G06F 16/345 |
| 2024/0394481 | A1 * | 11/2024 | Edwards | G06N 20/00 |
| 2024/0419658 | A1 * | 12/2024 | Trache | H04L 67/306 |
| 2025/0005269 | A1 * | 1/2025 | Ahmed | G06F 40/186 |
| 2025/0005299 | A1 * | 1/2025 | Padmanabhan | G06F 16/335 |

(Continued)

*Primary Examiner* — Olujimi A Adesanya
(74) *Attorney, Agent, or Firm* — Patterson + Sheridan, LLP

(57) ABSTRACT

Aspects of the present disclosure relate to dynamically generating prompts. Embodiments include receiving a query from a user and retrieving a prompt template based on the query, wherein the prompt template comprises: natural language instructions related to providing a response to the query, and one or more placeholders associated with indications of one or more electronic data sources from which relevant user data is to be retrieved. Embodiments further include retrieving, based on the indications associated with the placeholders in the prompt template, user data associated with the user from the one or more electronic data sources. Embodiments further include populating the prompt template to produce a dynamically generated prompt by replacing the placeholders with the retrieved user data associated with the user. Embodiments further include providing the dynamically generated prompt and the query to a machine learning model that has been trained to generate content.

20 Claims, 4 Drawing Sheets

(56) References Cited

U.S. PATENT DOCUMENTS

| | | | | |
|---|---|---|---|---|
| 2025/0053735 | A1* | 2/2025 | Shevchenko | G06F 40/30 |
| 2025/0077237 | A1* | 3/2025 | Sachindran | G06N 3/08 |
| 2025/0110618 | A1* | 4/2025 | Kumar | G06F 40/30 |
| 2025/0202844 | A1* | 6/2025 | Lin | H04L 51/02 |
| 2025/0238411 | A1* | 7/2025 | Padilha | G06F 11/3409 |

* cited by examiner

MACHINE LEARNING MODEL PROMPT HYDRATION VIA PROMPT REGISTRY AND CONTEXT STORE

INTRODUCTION

Aspects of the present disclosure relate to techniques for dynamic generation of machine learning model prompts. In particular, techniques described herein involve automatic retrieval and population of prompt templates with user information based on a user query, and generating content based on the generated prompt.

BACKGROUND

A growing number of people, businesses, and organizations around the world utilize machine learning models to assist with countless aspects of life. For example, machine learning models may be used to automate tedious tasks by generating content in response to prompts. By effectively utilizing prompts, these machine learning models can significantly reduce the amount of time and labor required to complete tasks.

Machine learning models are often configured to perform certain tasks for users, such as providing answers to questions or generating a specified type of content. However, several issues can arise during the use of these machine learning models. While machine learning models are powerful tools for content generation, they must be provided with the information necessary to generate such content. Providing a machine learning model with too little information or too much irrelevant information can result in the machine learning model not being able to generate the desired content. In some instances, machine learning models may even generate content that contains errors, which can cause an extensive waste of computing resources. This waste of computing resources is compounded if the errors in the generated content are not initially discovered, as the content generated by machine learning models may be used in other applications or processes. Furthermore, additional computing resources may be expended in association with correcting such errors when they are discovered.

Manually providing a machine learning model with the information it needs to perform a task is a complex and tedious process that renders existing machine learning technologies too burdensome for many people to effectively use. For example, millions of people use machine learning applications to answer simple questions that are based on publicly available information, but few people use these applications for answering user-specific questions because answering such questions often requires an extensive amount of user-specific data. In some instances, manually providing a machine learning model with required information can require an extensive amount of manual labor and computing resources. Furthermore, existing technologies do not provide for an efficient and automatic generation of machine learning model prompts that include user-specific information for performing machine learning tasks.

Thus, there is a need in the art for improved techniques for dynamic generation of machine learning prompts.

BRIEF SUMMARY

Certain embodiments provide a method of dynamic prompt generation. The method generally includes: receiving a query from a user; retrieving a prompt template based on the query, wherein the prompt template comprises: natural language instructions related to providing a response to the query, and one or more placeholders associated with indications of one or more electronic data sources from which relevant user data is to be retrieved for populating the prompt template; retrieving, based on the indications associated with the placeholders in the prompt template, user data associated with the user from the one or more electronic data sources; populating the prompt template to produce a dynamically generated prompt by replacing the placeholders with the retrieved user data associated with the user; and providing the dynamically generated prompt and the query to a machine learning model that has been trained to generate content in response to an input prompt and an input query.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
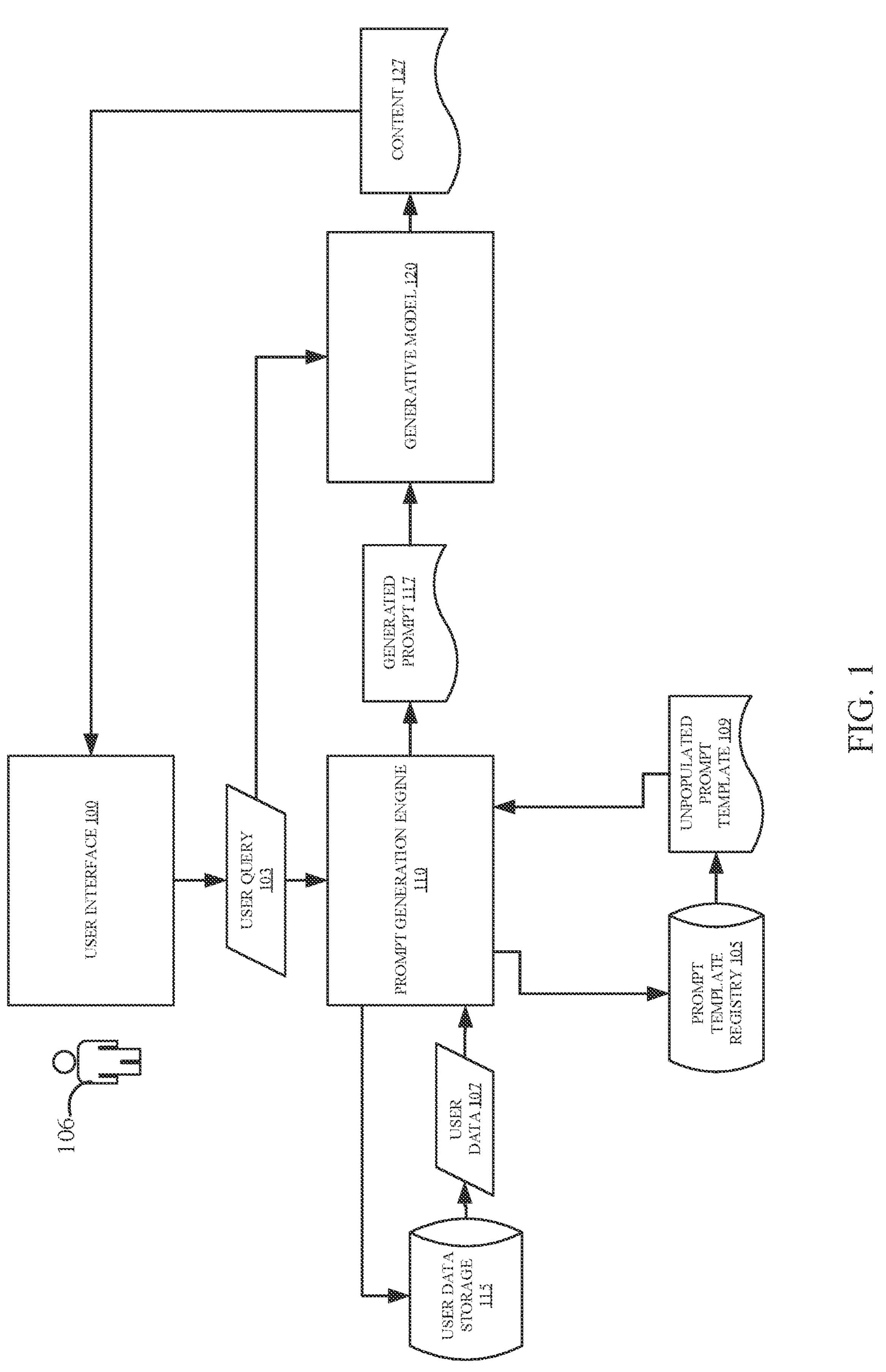
FIG. 1 depicts an example of computing components related to dynamic prompt generation.

Aspects of the present disclosure provide apparatuses, methods, processing systems, and computer-readable mediums for dynamic prompt generation.

According to certain embodiments, a prompt template is retrieved and automatically populated with user data in an efficient manner based on a query from a user. The prompt that is automatically generated by populating the template may then be provided to a machine learning model, allowing the machine learning model to generate an accurate response to the user query.

Prompts are generally used to direct a machine learning model to perform one or more desired functions. For example, a prompt may comprise natural language instructions to perform a task. When provided with the prompt, the machine learning model may perform the task. According to embodiments described herein, prompts may be automatically generated by populating a prompt template with data (e.g., filling in the templates with user data).

In some embodiments, multiple prompt templates are stored in a prompt template registry. Each template in the registry may have a corresponding identifier that allows for automatic retrieval of the template. Prompt templates may comprise natural language instructions related to providing a response to a query. The instructions may include directions for performing a task. The instructions may include labels and/or other descriptors for data that may be included in the prompt. Prompt templates may comprise placeholders that may be replaced with user data. A placeholder may contain an indication of an electronic data source where relevant user data is stored. In general, placeholders allow the computing system to automatically retrieve user data from a location referenced by the placeholder. For example, a placeholder may comprise an identifier that leads to a location in a user data store that allows a computing system to automatically populate the prompt with data corresponding to a given user.

Certain embodiments provide that a prompt template is retrieved based on a query that is received from a user. A query may, for example, comprise a natural language question and/or a natural language request to perform a task. A query may comprise an indication of a particular prompt template that is helpful or necessary for completing a task. For example, the query may contain an identifier of a particular prompt template. Based on this identifier, the system may automatically retrieve the corresponding prompt template from the prompt template registry.

In some embodiments, the query from a user may indicate a use case that indicates a prompt for selection. Each use case may be associated with an identifier corresponding to a prompt template. Use cases may comprise, for example, a desired task for a machine learning model based on user data from one or more software applications. As an example, a user may want to generate a report detailing the user's tax liability for a given year. Creating a tax liability report may be one of the use cases that a user may select. If the user selects this use case, then a prompt template may be selected that corresponds to an identifier associated with the use case. The prompt template may contain a placeholder that allows the computing system to automatically retrieve data associated with the user that allows a machine learning model to generate a report detailing the user's tax liability.

According to certain embodiments, user data associated with the user is retrieved from one or more electronic data sources based on the indications associated with the placeholders in the prompt template. User data is generally any type of electronically stored data that is associated with the user, such as data corresponding to the user's use of a software application (e.g., user clickstream data) or other data associated with the user (e.g., the user's address, transaction data associated with the user, or biometric data associated with the user). The electronic data sources may be, for example, data storage locations for data corresponding to one or more software applications. As an example, a user may have profiles corresponding to multiple health monitoring software applications. If a prompt template contains an identifier of a location in memory that stores the user's health data, the system may retrieve the user's health data from data storage mediums associated with the software applications.

In some embodiments, the data sources may be structured in a way that allows the computing system to automatically retrieve data for a given user based on the indication in the placeholder of the prompt template. For example, the data source may store data corresponding to a user attribute in a particular memory location, and this location may be associated with a particular identifier. The indication in the placeholder may contain a reference to the identifier associated with the particular location. Based on the indication, the computing system may then automatically populate the prompt template with the data from that location that is associated with the user. The system may determine that the data is associated with the user because the data is associated with an identifier that corresponds to the user.

In certain embodiments, populating the prompt templates is achieved by replacing the placeholder in the prompt template with the data that was retrieved based on the indication within the placeholder. A prompt template wherein one or more placeholders have been replaced by user data is referred to as a generated prompt.

Some embodiments provide that the generated prompt is provided to a machine learning model that has been trained to generate content in response to an input prompt and an input query. In response to receiving the generated prompt and the query, the machine learning model may generate content. The content may be, for example, an answer to a question found in the query based on data contained within the prompt. The machine learning model may be, for example, a generative model such as a large language model.

Certain embodiments provide that candidate prompt templates are used for test cases, and the candidate prompt that produces the most optimal result is selected for inclusion in the prompt template registry. Candidate prompt templates are generally prompt templates that have been newly created or are otherwise under consideration for inclusion in the prompt template registry. Test cases may comprise a hypothetical user scenario with a known desired output. The hypothetical user scenario may include a sample user query and sample user data. The candidate prompt that causes the machine learning model to produce the result that is closest to the known desired output based on the sample user query and sample user data is chosen for inclusion in the prompt template registry.

In certain embodiments, a set of prompt templates may correspond to a particular use case or identifier, and one template of the set may be chosen based on the type of machine learning model that is used. For example, a particular use case or identifier may correspond to a particular desired function for a machine learning model. Each prompt of the set of prompts may be configured to allow a different type of machine learning model to perform this desired function. For example, one prompt of the set may be optimized for use with a first generative pre-trained (GPT) model version, while another prompt of the set may be optimized for use in a second GPT model version. If the first GPT model version is used, then the prompt of the set that is optimized for use with the first GPT model version is chosen.

Embodiments of the present disclosure provide numerous technical and practical effects and benefits. For instance, the techniques disclosed herein allow machine learning technologies to do something they were not capable of doing before: efficiently and automatically retrieving and using user data in performing user-specific tasks based on a user query that does not itself include such user data. Furthermore, by allowing for automatic retrieval and use of user data in performing user-specific machine learning tasks, the teachings of the present disclosure save a significant amount of time and resources that would otherwise be expended in the process of locating and retrieving such data and providing it to a machine learning model through other means, such as manual labor. Also, by providing the machine learning model with data that is relevant for performing a given task, embodiments of the present disclosure avoid the utilization of computing resources that would otherwise be expended in generating and using content that contains errors, and correcting such content. Additionally, the teachings of the present disclosure enable members of the general public to use machine learning technologies to perform user-specific tasks with quality results without the need to understand underlying electronic data sources or manually engineer a prompt. Finally, by automatically retrieving and providing a machine learning model with relevant user data through the use of the prompt templates described herein, embodiments of the present disclosure enable a machine learning model to produce results that are more accurate, contextualized, and useful than those produced by existing machine learning techniques in response to user queries.

Example Components Related to Dynamic Prompt Generation

FIG. 1 is an illustration of example computing components related to dynamic prompt generation.

A user 106 may provide a user query 103 to the system through a user interface 100. The user query 103 may comprise one or more natural language questions and/or a natural language request to perform one or more tasks. As described in further detail below, the user query may contain an indication of a particular unpopulated prompt template 109 that may assist the generative model 120 in performing the one or more tasks or answering the one or more questions. The indication may be an identifier associated with a particular unpopulated prompt template 109 stored in the prompt template registry 105. The indication may be a use case that indicates an unpopulated prompt template 109. Use cases may comprise desired functions for the generative model 120. Each use case may correspond to an identifier associated with a particular unpopulated prompt template 109 stored in the prompt template registry 105.

The user query 103 may be provided to the prompt generation engine 110. The prompt generation engine 110 may run on one or more processors, and mat be configured to produce generated prompts 117 based on user queries 103. Based on the indication contained within the user query 103, the prompt generation engine 110 may automatically retrieve the unpopulated prompt template 109 indicated by the query 103 from the prompt template registry 105.

The prompt template registry 105 may contain multiple unpopulated prompt templates 109. Each unpopulated prompt template 109 within the registry 105 may be associated with an identifier that allows the prompt generation engine 110 to automatically retrieve the unpopulated prompt template 109 based on an indication contained within a user query 103. In certain embodiments, candidate prompt templates may be used in test cases to determine which candidate prompt template to include in the registry 105. A test case may comprise a hypothetical situation with a test user query, test user data, and a known desired output. The candidate prompt template that causes the generative model 120 to produce content 127 that is closest to the known desired output may be included in the registry 105 as one of the unpopulated prompt templates 109.

The unpopulated prompt template 109 may contain natural language instructions that direct a machine learning model to perform a task such as answering a question, as well as a description of data that may be used to populate the prompt. The unpopulated prompt template 109 may contain a placeholder for user data 107 that indicates a location in the user data storage 115 where the user data 107 is stored. The indication may comprise an identifier associated with the location in user data storage 115 (or an identifier of another local or remote data source, such as an address from which the data can be retrieved) where the user data 107 is located. The identifier may allow the prompt generation engine 110 to automatically retrieve the user data 107 corresponding to the user 106 from user data storage 115. The user data 107 that corresponds to the user 106 may be identified by an identifier that associates the user data 107 with the user 106.

User data storage 115 may comprise user data from one or more software applications. For example, a software application may utilize a database for storing data associated with users of the software application. User data storage 115 may include this database, along with other similar databases corresponding to other software applications.

The user data 107 that is retrieved from user data storage 115 is generally any data that is associated with the user 106. This data 107 may correspond to the user's use of the software application (e.g., the amount of time that the user 106 has spent using the software application). The user data 107 may correspond to user activity external to the software application (e.g., a user's contact list, a user's financial information, biometric data associated with the user, etc.).

The prompt generation engine 110 may use the user data 107 and the unpopulated prompt template 109 to produce a generated prompt 117. As discussed above, the prompt generation engine 110 may retrieve the unpopulated prompt template 109 automatically based on an indication found within the user query 103. As discussed above, the prompt generation engine 110 may then automatically retrieve user data 107 based on an indication found in a placeholder within the retrieved unpopulated prompt template 109. The prompt generation engine 110 may then produce a generated prompt 117 by replacing one or more placeholders in the unpopulated prompt template 109 with user data 107 indicated by the one or more placeholders. A generated prompt 117 may be a prompt template wherein one or more placeholders have been replaced by user data 107. As an example, the generated prompt 117 may comprise the retrieved user data 107, descriptions of the user data, and natural language instructions that direct a machine learning model to perform a task.

The generated prompt 117 and the user query 103 may be provided to a generative model 120. The generative model 120 may comprise one or more machine learning models. For example, the generative model may include a large language model, or other types of machine learning models that are capable of generating content. The generative model 120 may be trained to generate content 127 in response to generated prompts 117 and user queries 103. The content 127 may include an output from the generative model 120 that satisfies a user query 103. For example, if a user query 103 contains a question, the content 127 may include an answer to the question.

In some embodiments, feedback may be received from the user 106 regarding generated content 127. The user feedback may include natural language feedback. A natural language processing model or technique may be applied to natural language feedback in order to determine what the user 106 liked or did not like about the content 127, as well as any issues that need to be addressed regarding the content 127 (e.g., formatting). Feedback may also be received in the form of a user 106 accepting or rejecting content 127, or a user 106 modifying content 127 or otherwise providing alternative content 127. The information gathered from the feedback may then be used to re-train the generative model 120, as discussed in further detail below.

Training or fine-tuning of a machine learning model such as the generative model 120 may involve supervised and/or unsupervised learning processes. Supervised learning techniques generally involve providing training inputs to a machine learning model. The machine learning model processes the training inputs and outputs predictions based on the training inputs. The predictions are compared to the known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

Example Unpopulated Prompt Template

Figure 2:
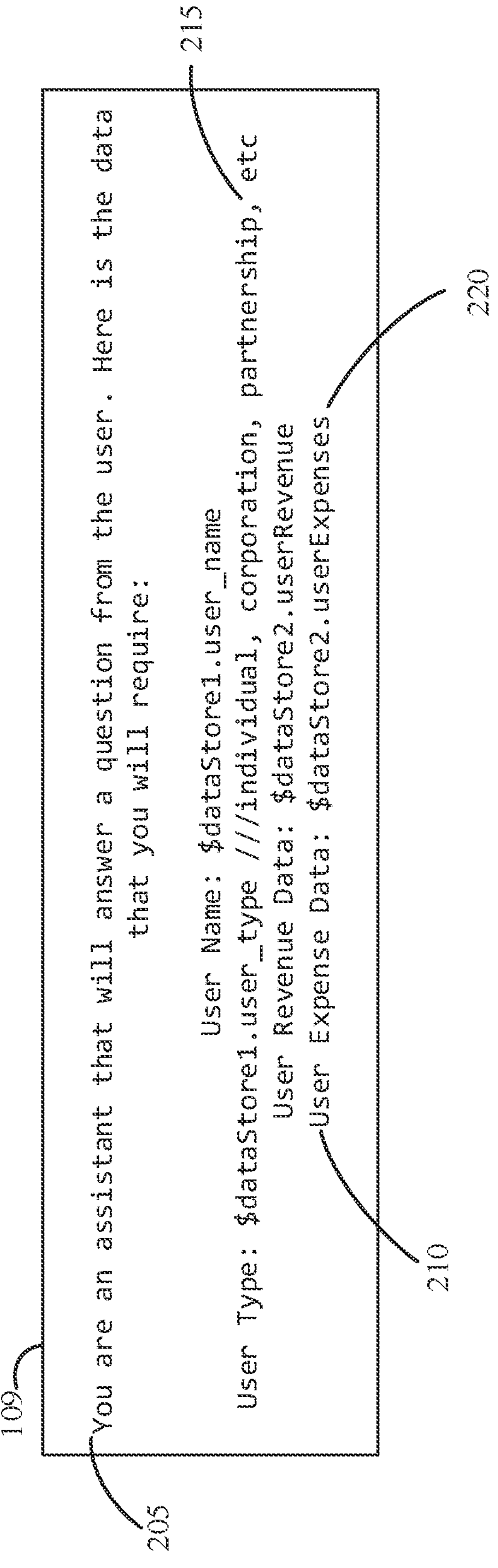
FIG. 2 depicts an example of an unpopulated prompt template.

FIG. 2 is an illustration of an example unpopulated prompt template 109.

In some embodiments, the prompt template 109 may be designed to direct a machine learning model to answer a query from a user, as shown in FIG. 2. The template may comprise natural language instructions 205 that direct a machine learning model to answer a query, and the instructions may provide the machine learning model with required context for answering the query. For example, the instructions 205 may direct the machine learning model to behave as an assistant in order to answer the user's query, as shown in FIG. 2.

The prompt template 109 may include one or more labels 210, comments 215, and/or other descriptors that describe data that will be inserted into the template 109. These labels 210, comments 215, and/or any other descriptors provide a machine learning model with additional context which helps the machine learning model to process the data and thus generate effective content in response to queries. One of the labels 210 shown in FIG. 2 is "User Expense Data." This label 210 will inform a machine learning model that the data associated with the label 210 is expense data associated with a given user. The comment 215 shown in FIG. 2 will inform a machine learning model that the data associated with the "User Type" label indicates which type of entity a user is (i.e., an individual, a corporation, a partnership, or another type of entity).

The prompt template may include one or more placeholders 220. The placeholders 220 may comprise an indication of a location in an electronic data source where relevant user data can be found. For example, the placeholder 220 may be an identifier of a location inside a data source. One of the placeholders 220 shown in FIG. 2 contains the name of a data source and the name of a location within the data source where a user's expense data may be found. Based on this placeholder 220, a processor configured to generate prompts may automatically retrieve the user's expense data (e.g., based on an identifier of the user that submitted the user query, such as by querying an electronic data source indicated in placeholder 220 for the indicated type of data associated with the identifier of the user) and use this data to replace the placeholder 220. By replacing placeholders 220 with user data, the processor can turn the unpopulated prompt template 109 into a generated prompt. The generated prompt may further include the user query, and may be submitted to a machine learning model such as generative model 120 of FIG. 1 in order to generate a response to the user query.

The prompt template shown in FIG. 2 corresponds to a tax filing software application. However, it is noted that the teachings contained herein are generally applicable to any type of software application that electronically stores any type of user data. For example, the software application may be a messaging application, and the data stored by this application may include clickstream data or contact information.

Example Operations Related to Dynamic Prompt Generation

Figure 3:
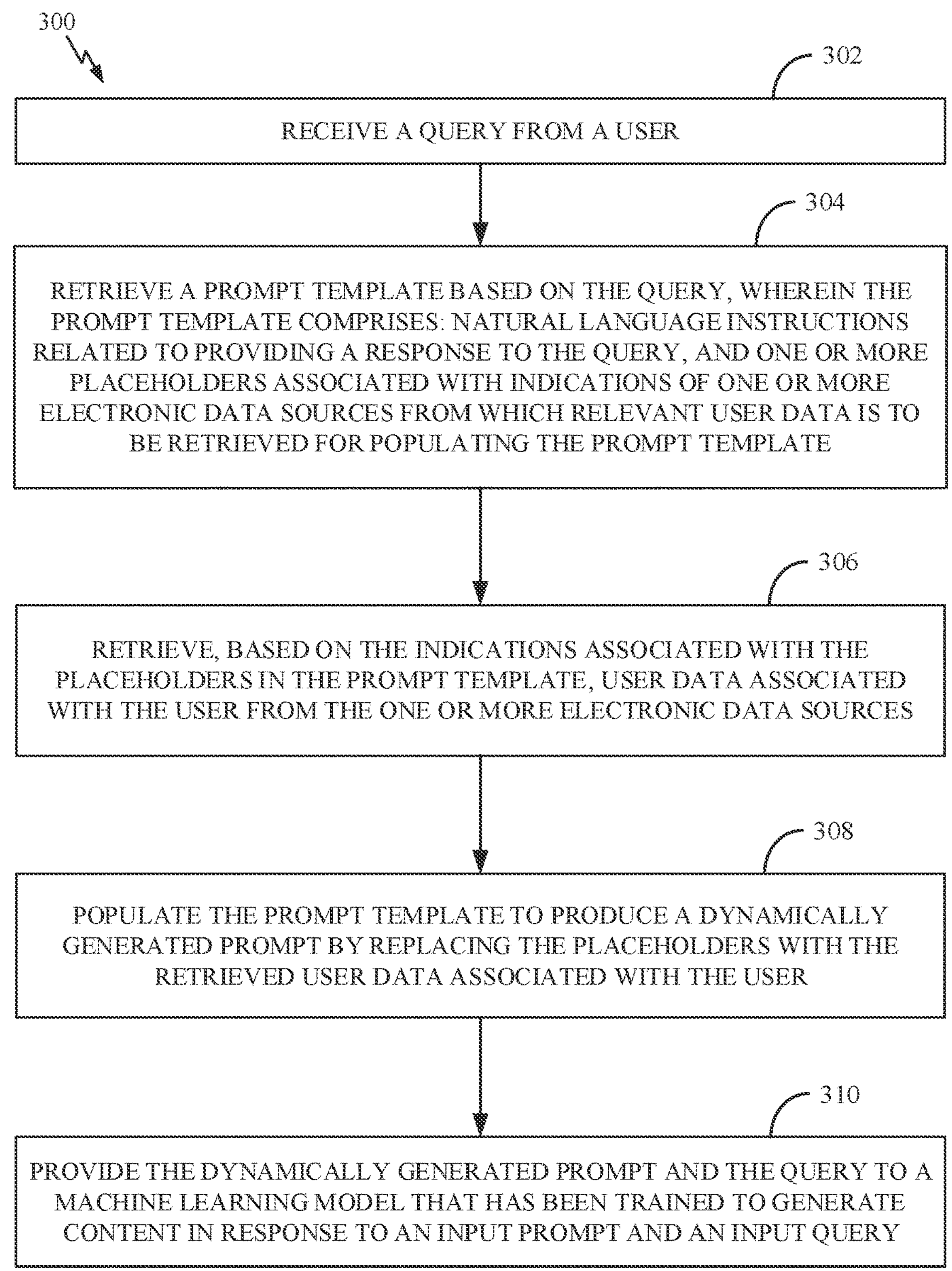
FIG. 3 depicts example operations related to dynamic prompt generation.

FIG. 3 depicts example operations 300 related to generating software application content. For example, operations 300 may be performed by one or more of the components described with respect to FIG. 1.

Operations 300 begin at step 302 with receiving a query from a user.

Operations 300 continue at step 304 with retrieving a prompt template based on the query, wherein the prompt template comprises: natural language instructions related to providing a response to the query, and one or more placeholders associated with indications of one or more electronic data sources from which relevant user data is to be retrieved for populating the prompt template. In some embodiments, a plurality of prompt templates, including the retrieved prompt template, are created and stored in a prompt template registry from which a prompt template is retrieved. Certain embodiments provide that each prompt template of the plurality of prompt templates is associated in the prompt template registry with a corresponding identifier that allows for automatic retrieval of the prompt template. According to some embodiments, the plurality of prompt templates are selected for inclusion in the prompt template registry based on using candidate prompt templates for test cases and evaluating results of the test cases. Some embodiments provide that the query indicates a use case, and the prompt template is retrieved based on determining that the prompt template is associated with an identifier corresponding to the use case. In certain embodiments, the query identifies the prompt template. Some embodiments provide that retrieving the prompt template is further based on a type of the machine learning model.

Operations 300 continue at step 306 with retrieving, based on the indications associated with the placeholders in the prompt template, user data associated with the user from the one or more electronic data sources. In some embodiments, the one or more electronic data sources contain data from a software application profile associated with the user.

Operations 300 continue at step 308 with populating the prompt template to produce a dynamically generated prompt by replacing the placeholders with the retrieved user data associated with the user.

Operations 300 continue at step 310 with providing the dynamically generated prompt and the query to a machine learning model that has been trained to generate content in response to an input prompt and an input query. Certain embodiments provide that the machine learning model is a large language model. In some embodiments, the machine learning model is retrained based on user feedback.

Example of a Processing System for Dynamic Prompt Generation

Figure 4:
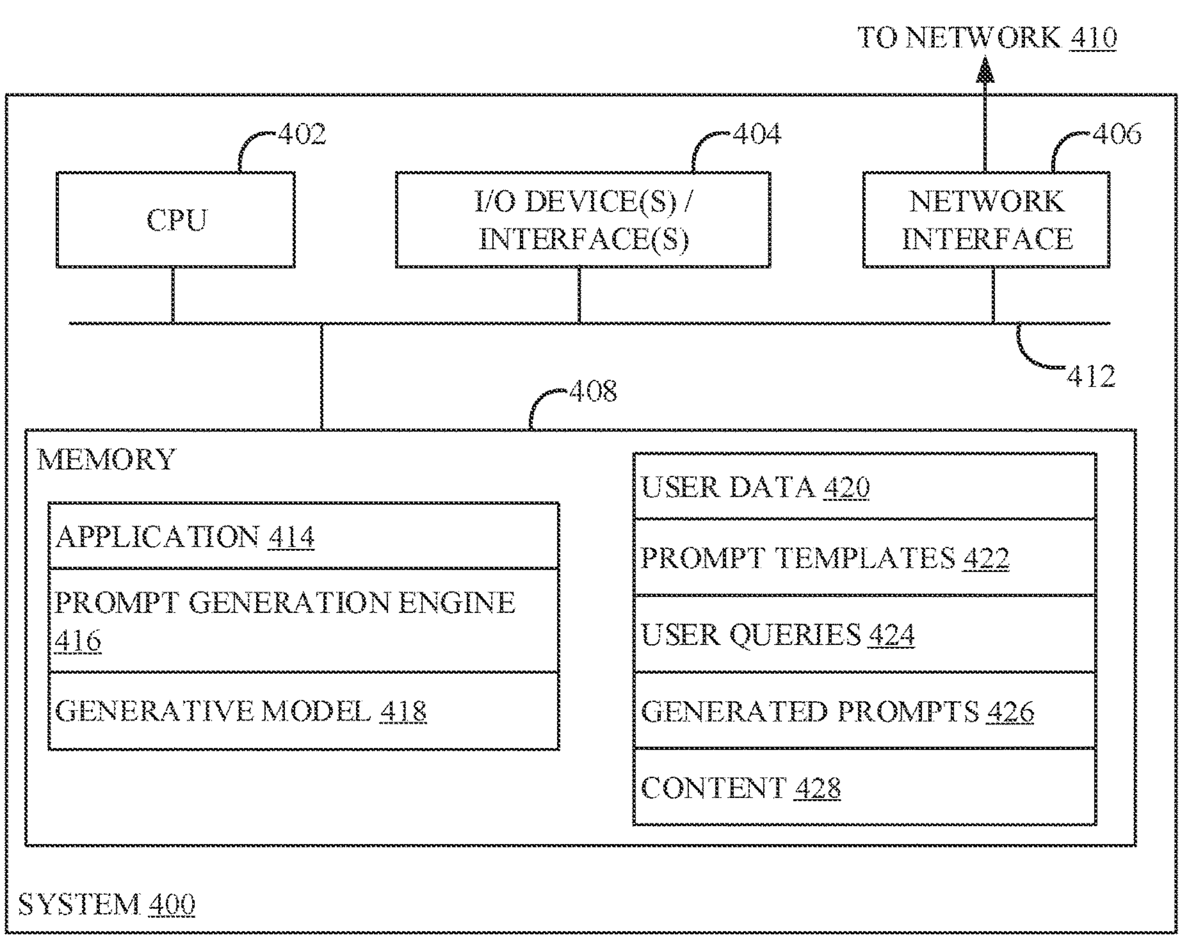
FIG. 4 depicts an example of a processing system for dynamic prompt generation.

FIG. 4 illustrates an example system 400 with which embodiments of the present disclosure may be implemented. For example, system 400 may be configured to perform operations 300 of FIG. 3 and/or to implement one or more components as in FIG. 1.

System 400 includes a central processing unit (CPU) 402, one or more I/O device interfaces that may allow for the connection of various I/O devices 404 (e.g., keyboards, displays, mouse devices, pen input, etc.) to the system 400, network interface 406, a memory 408, and an interconnect 412. It is contemplated that one or more components of system 400 may be located remotely and accessed via a network 410. It is further contemplated that one or more components of system 400 may comprise physical components or virtualized components.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408. CPU 402 is included to be representative of a single CPU, multiple CPUs, a single CPU having multiple processing cores, and other arrangements.

Additionally, the memory 408 is included to be representative of a random access memory or the like. In some embodiments, memory 408 may comprise a disk drive, solid state drive, or a collection of storage devices distributed across multiple storage systems. Although shown as a single unit, the memory 408 may be a combination of fixed and/or removable storage devices, such as fixed disc drives, removable memory cards or optical storage, network attached storage (NAS), or a storage area-network (SAN).

As shown, memory 408 includes application 414, prompt generation engine 416, and generative model 418. In some embodiments, application 414 may be representative of a software application that contains user data storage 115 of FIG. 1. Prompt generation engine 416 may be representative of prompt generation engine 110 of FIG. 1. Generative model 418 may be generative model 120 of FIG. 1.

Memory 408 further comprises user data 420, which may correspond to user data 107 of FIG. 1. Memory 408 further comprises prompt templates 422 which may correspond to unpopulated prompt template 109 of FIG. 1 and FIG. 2. Memory 408 further comprises user queries 424, which may correspond to user query 103 of FIG. 1. Memory 408 further comprises generated prompts 426, which may correspond to generated prompt 117 of FIG. 1. Memory 408 further comprises content 428, which may correspond to content 127 of FIG. 1.

It is noted that in some embodiments, system 400 may interact with one or more external components, such as via network 410, in order to retrieve data and/or perform operations.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of dynamic prompt generation, comprising:

receiving a query from a user, wherein the query corresponds to a use case associated with a software application;

retrieving a prompt template based on the query, wherein the prompt template comprises:

natural language instructions related to providing a response to queries corresponding to the use case, and a placeholder comprising an indication of a location within a data source that contains data associated with the use case;

retrieving, based on the placeholder, data associated with the user from the indicated location in the data source;

populating the prompt template to produce a dynamically generated prompt by replacing the placeholder with the retrieved data; and providing the dynamically generated prompt and the query to a machine learning model that has been trained to generate content in response to an input prompt and an input query.

2. The method of claim 1, wherein a plurality of prompt templates, including the prompt template, are created and stored in a prompt template registry from which the prompt template is retrieved.

3. The method of claim 2, wherein each prompt template of the plurality of prompt templates is associated in the prompt template registry with a corresponding identifier that allows for automatic retrieval of the prompt template.

4. The method of claim 2, wherein the plurality of prompt templates are selected for inclusion in the prompt template registry based on using candidate prompt templates for test cases and evaluating results of the test cases.

5. The method of claim 1, wherein the query indicates a use case, and wherein the retrieving of the prompt template is based on determining that the prompt template is associated with an identifier corresponding to the use case.

6. The method of claim 1, wherein the query identifies the prompt template.

7. The method of claim 1, wherein the data source contains data from a software application profile associated with the user.

8. The method of claim 1, wherein the machine learning model is a large language model.

9. The method of claim 1, wherein retrieving the prompt template is further based on a type of the machine learning model.

10. The method of claim 1, wherein the machine learning model is retrained based on user feedback.

11. A system for dynamically generating prompts, comprising:

a data source comprising one or more data storage locations, each respective data storage location of the one or more data storage locations containing data associated with a respective use case indexed by user;

one or more processors; and a memory comprising instructions that, when executed by the one or more processors, cause the system to:

receive a query from a user, wherein the query corresponds to a given use case associated with a software application;

retrieve a prompt template based on the query, wherein the prompt template comprises:

natural language instructions related to providing a response to the queries corresponding to the given use case, and a placeholder comprising an indication of a given data storage location of the one or more data storage locations, wherein the given data storage location contains data associated with the given use case;

retrieve, based on the placeholder, data associated with the user from the given data storage location;

populate the prompt template to produce a dynamically generated prompt by replacing the placeholder with the retrieved data; and provide the dynamically generated prompt and the query to a machine learning model that has been trained to generate content in response to an input prompt and an input query.

12. The system of claim 11, wherein a plurality of prompt templates, including the prompt template, are created and stored in a prompt template registry from which the prompt template is retrieved.

13. The system of claim 12, wherein each prompt template of the plurality of prompt templates is associated in the prompt template registry with a corresponding identifier that allows for automatic retrieval of the prompt template.

14. The system of claim 12, wherein the plurality of prompt templates are selected for inclusion in the prompt template registry based on using candidate prompt templates for test cases and evaluating results of the test cases.

15. The system of claim 11, wherein the query indicates a use case, and wherein the retrieving of the prompt template is based on determining that the prompt template is associated with an identifier corresponding to the use case.

16. The system of claim 11, wherein the query identifies the prompt template.

17. The system of claim 11, wherein the data source contains data from a software application profile associated with the user.

18. The system of claim 11, wherein the machine learning model is a large language model.

19. The system of claim 11, wherein retrieving the prompt template is further based on a type of the machine learning model.

20. A non-transitory computer readable medium comprising instructions that, when executed by one or more processors of a computing system, cause the computing system to:

receive a query from a user, wherein the query corresponds to a use case associated with a software application;

retrieve a prompt template based on the query, wherein the prompt template comprises:

natural language instructions related to providing a response to queries corresponding to the use case, and one or more placeholders associated with a placeholder comprising an indication of a location within a data source that contains data associated with the use case;

retrieve, based on the placeholder, data associated with the user from the indicated location in the data source;

populate the prompt template to produce a dynamically generated prompt by replacing the placeholder with the retrieved data; and provide the dynamically generated prompt and the query to a machine learning model that has been trained to generate content in response to an input prompt and an input query.

* * * * *